United States Patent
Brady et al.

(10) Patent No.: US 11,080,085 B2
(45) Date of Patent: Aug. 3, 2021

(54) WATCHDOG TIMER FOR A MULTI-STAGE COMPUTING ENVIRONMENT

(71) Applicant: International Business Machines Corporation, Armonk, NY (US)

(72) Inventors: Simon Brady, Dublin (IE); Clea A. Zolotow, Key West, FL (US); Barry Hollywood, Navan (IE); Jørgen E. Floes, Stenløse (DK); Pedro Soares, Silveira (PT); Anastasios Xouzafeiris, Brno (CZ)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 16/221,912

(22) Filed: Dec. 17, 2018

(65) Prior Publication Data

US 2020/0192698 A1 Jun. 18, 2020

(51) Int. Cl.
| | |
|---|---|
| *G06F 9/46* | (2006.01) |
| *G06N 20/00* | (2019.01) |
| *G06F 17/16* | (2006.01) |
| *G06F 11/07* | (2006.01) |
| *G06K 9/62* | (2006.01) |

(52) U.S. Cl.
CPC .......... *G06F 9/466* (2013.01); *G06F 11/0757* (2013.01); *G06F 17/16* (2013.01); *G06K 9/6278* (2013.01); *G06N 20/00* (2019.01)

(58) Field of Classification Search
USPC ........................................................ 718/101
See application file for complete search history.

(56) References Cited

U.S. PATENT DOCUMENTS

| | | | | |
|---|---|---|---|---|
| 5,398,332 A * | 3/1995 | Komoda | ............... | G06F 11/076 714/55 |
| 7,647,524 B2 * | 1/2010 | Ide | ........................... | H04L 69/40 714/38.13 |
| 8,862,728 B2 * | 10/2014 | Jayachandran | ..... | G06F 11/0754 709/224 |
| 9,171,158 B2 * | 10/2015 | Akoglu | ................. | G06F 16/215 |
| 9,298,531 B1 | 3/2016 | Sheets et al. | | |

(Continued)

OTHER PUBLICATIONS

Huang et al., "Automated Fault Detection and Diagnosis in Mechanical Systems," IEEE, 2007, 5pg. (Year: 2007).*

(Continued)

*Primary Examiner* — Ryan D. Coyer
(74) *Attorney, Agent, or Firm* — Steven Bouknight; Edell, Shapiro & Finnan, LLC

(57) ABSTRACT

A computer system manages multi-stage transactions. A plurality of response time values of transaction components for a plurality of transactions are received. Two or more transactions from the plurality of transactions are selected, wherein a quantity of the selected transactions is equal to a number of the transaction components in the plurality of transactions. Eigenvalues are calculated from the response time values for the selected transactions. The selected transactions are determined to have timed out by processing the eigenvalues using a machine learning classifier. Embodiments of the present invention further include a method and program product for managing multi-stage transactions in substantially the same manner described above.

15 Claims, 4 Drawing Sheets

(56) References Cited

U.S. PATENT DOCUMENTS

| | | | |
|---|---|---|---|
| 2008/0162361 A1* | 7/2008 | Sklovsky | G06Q 20/3278 |
| | | | 705/65 |
| 2014/0082403 A1 | 3/2014 | Kraev | |
| 2015/0269226 A1* | 9/2015 | Veldhuizen | G06F 16/2315 |
| | | | 707/625 |
| 2017/0147394 A1 | 5/2017 | Bates et al. | |
| 2018/0157603 A1 | 6/2018 | Schulz et al. | |
| 2019/0149480 A1* | 5/2019 | Singhvi | H04L 47/78 |
| | | | 709/226 |

OTHER PUBLICATIONS

Ralston et al., "Computer-Based Monitoring and Fault Diagnosis: A Chemical Process Case Study," Elsevier, 2001, 14pg. (Year: 2001).*
"Naive Bayes—RDD-based API", Spark 2.0.2 Documentation, http://spark.apache.org/docs/2.0.2/mllib-naive-bayes.html, retrieved from internet Dec. 2018, 2 pages.
AWS Lambda: Developer Guide, https://docs.aws.amazon.com/lambda/latest/dg/welcome.html, Amazon Web Services, Inc., 2018, 557 pages.

* cited by examiner

| TRANSACTION | TIME 1 | TIME 2 | TIME 3 |
|---|---|---|---|
| 1 | 2 ms | 3 ms | 2 ms |
| 2 | 4 ms | 2 ms | 2 ms |
| 3 | 1 ms | 2 ms | 3 ms |

FIG.3

WATCHDOG TIMER FOR A MULTI-STAGE COMPUTING ENVIRONMENT

BACKGROUND

1. Technical Field

Present invention embodiments relate to multi-stage computing environments, and more specifically, to a watchdog timer for a multi-stage computing environment.

2. Discussion of the Related Art

In a networking setting, a watchdog timer is a timer that is used to detect potential malfunctions by measuring a duration of time in which responses may be received. During normal operations, a response is received from a monitored component before the watchdog timer runs out, and the timer is reset. When a response is not received in the allotted time, the watchdog timer is tripped, and one or more recovery operations may be performed. A watchdog timer in a multi-stage computing environment may have a separate countdown timer for each step in a multistep transaction.

SUMMARY

According to one embodiment of the present invention, a computer system manages multi-stage transactions. A plurality of response time values of transaction components for a plurality of transactions are received. Two or more transactions from the plurality of transactions are selected, wherein a quantity of the selected transactions is equal to a number of the transaction components in the plurality of transactions. Eigenvalues are calculated from the response time values for the selected transactions. The selected transactions are determined to have timed out by processing the eigenvalues using a machine learning classifier. Embodiments of the present invention further include a method and program product for managing multi-stage transactions in substantially the same manner described above.

BRIEF DESCRIPTION OF THE DRAWINGS

Generally, like reference numerals in the various figures are utilized to designate like components.

FIG. 3 is a chart depicting example transaction times in accordance with an embodiment of the present invention.

DETAILED DESCRIPTION

Present invention embodiments relate generally to multi-stage computing environments, and more specifically, to watchdog timers in multi-stage computing environments. In a networking setting, a watchdog timer is a timer that is used to detect potential malfunctions by measuring a duration of time in which responses may be received Conventional watchdog timers in multi-stage computing environments may trip when any single element in a transaction runs over its allotted time, even though the transaction as a whole might have had an acceptable response time. In contrast, present invention embodiments classify a transaction by analyzing the separate response times of the transaction as a whole in order to determine whether any remedial measures, such as performing an interrupt, are needed. Thus, if one element of a transaction is over-time, but another element of the transaction is under-time, the transaction may not be interrupted. Present invention embodiments construct a matrix using response times of multiple transactions, compute eigenvalues of the matrix, and then utilize machine learning techniques to determine whether or not the transactions have timed out. By using eigenvalues to classify transactions, present invention embodiments reduce processing and memory resource requirements, since multiple transactions may be classified simultaneously. Further, transactions may be completed that otherwise would be interrupted, thereby reducing repeated processing of the transactions.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
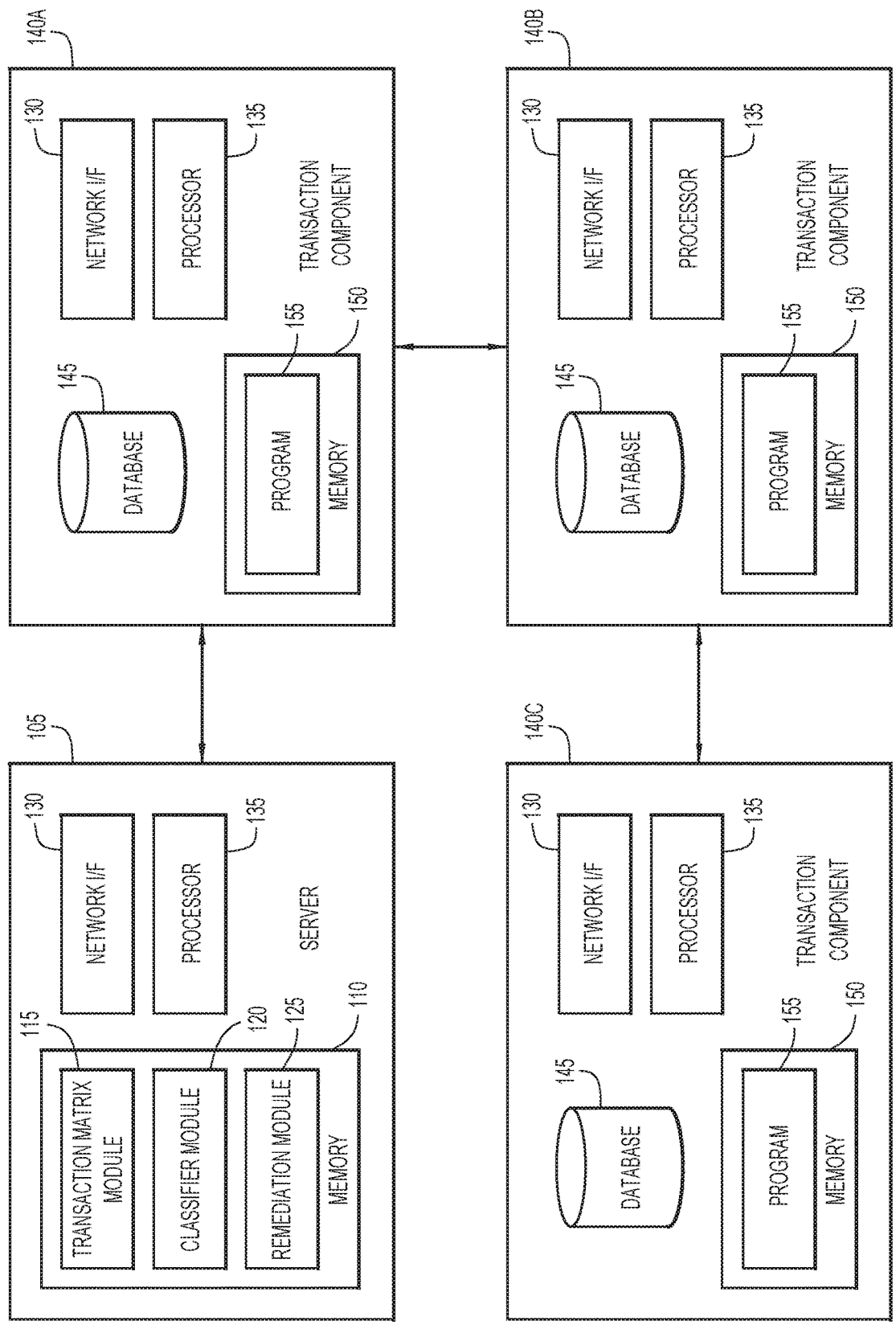
FIG. 1 is a block diagram depicting a multi-stage computing environment in accordance with an embodiment of the present invention.

Present invention embodiments will now be described in detail with reference to the Figures. FIG. 1 is a block diagram depicting a multi-stage computing environment 100 in accordance with an embodiment of the present invention. As depicted, computing environment 100 includes a server 105 and a plurality of transaction components 140A-140C. In some embodiments, computing environment 100 is a serverless computing environment or a function as a service (FaaS) environment. In general, server 105 engages in multi-stage transactions across transaction components 140A-140C, and utilizes a watchdog timer as described in the embodiments presented herein to monitor the multi-stage transactions.

In a multi-stage transaction, data may be sent from transaction component 140C to transaction component 140B, which sends data to transaction component 140A, which in turn sends data to server 105; server 105 may likewise send data to a transaction component, such as transaction component 140C, via intervening transaction components, such as transaction components 140B and 140C. Alternatively, server 105 may engage in a transaction with transaction component 140A, which requires additional data from transaction component 140B in order to complete the transaction, which, in turn, requires additional data from transaction component 140C. For example, a website (e.g., transaction component 140A) may request data from middleware (e.g., transaction component 140B), which fetches data from a database (e.g., transaction component 140C). In various embodiments, there may be any number of transaction components that participate in a transaction, and the number of transaction components presented in computing environment 100 has been chosen for purposes of explaining the present invention embodiments and is not to be construed as a limiting example. Furthermore, it is to be understood that the functional division among components of computing environment 100 have been chosen for purposes of explaining the present invention embodiments and is not to be construed as a limiting example.

Server 105 includes memory 110 with transaction matrix module 115, classifier module 120, and remediation module 125, a network interface 130, and at least one processor 135. In various embodiments of the present invention, server 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Server 105 may include internal and external hardware components, as depicted and described in further detail with respect to FIG. 4.

Transaction matrix module 115, classifier module 120, and remediation module 125 may include one or more modules or units to perform various functions of present invention embodiments described below. Transaction matrix module 115, classifier module 120, and remediation module 125 may be implemented by any combination of any quantity of software and/or hardware modules or units, and may reside within memory 110 of server 105 for execution by a processor, such as processor 135.

Transaction matrix module 115 may receive response times from each transaction component 140A-140C. When a transaction occurs, data may be sent to or from server 105 to a transaction component, such as transaction component 140C via intervening transaction components, such as transaction components 140A and 140B. During a transaction, each transaction component may have a corresponding response time. For example, in one transaction, transaction component 140A may have a 2 ms response time, transaction component 140B may have a 3 ms response time, and transaction component 140C may have a 3 ms response time, totaling an overall transaction time of 8 ms. Response times may be due to one or more operations carried out by each transaction component 140A-140C, such as processing of data, loading data from persistent storage into memory, and the like. Response times may also include transport time of data across a network. In some embodiments, response times are collected via a protocol such as Simple Network Management Protocol (SNMP), and/or may be collected in a log file using a client-server logging tool such as syslog. Response times may be received in an agentless fashion (e.g., without installing agents on transaction components 140A-140C). In some embodiments, transaction matrix module 115 collects response time data in a data lake.

Transaction matrix module 115 may arrange received response times in an m×m (e.g., square) matrix in order to calculate eigenvalues for the matrix. To ensure a square matrix, transaction matrix module 115 may collect a number of transactions equal to the number of response times in the transaction. For example, if there are three response times per transaction, then transaction matrix module 115 may assemble a matrix that includes three separate transactions, with each row including the response times from one transaction. The calculation of eigenvalues from response times will be discussed in more detail below with reference to FIGS. 3A and 3B.

Classifier module 120 may analyze one or more eigenvalues of a group of transactions in order to classify the transactions as a whole as either timed out or not timed out. Classifier module 120 may utilize conventional or other machine learning techniques in order to classify transactions. In general, the magnitudes of the calculated eigenvalues grows larger when there are anomalous transaction times; this relationship may be used to train classifier module 120. In some embodiments, classifier module 120 uses a learning database that employs Bayesian forecasting. Classifier module 120 may utilize a naive Bayes classifier that learns to divide input eigenvalues into one of two classes that indicate whether or not the group of transactions has timed out. Classifier module 120 may be trained with a sample set of eigenvalues having known "timed out" or "not timed out" classifications, and once trained, may predict the probability of a new input belonging to one of those classes.

Remediation module 125 may perform one or more remedial operations in response to classifier module 120 having determined that a group of transactions has timed out. In some embodiments, when a group of transactions has timed out, remediation module 125 interrupts the function responsible for performing the transactions. Remediation module 125 may then instruct the function to attempt to complete the transaction again after a period of time. Additionally or alternatively, remediation module 125 may restart one or more transaction components in response to a timed-out transaction. In some embodiments, remediation module 125 may send a notification to an administrator that a group of transactions has timed out. The notification may include averaged response times of transaction components during the timed-out period to indicate which transaction component(s) are causing the transaction to time out. In some embodiments, when a group of transactions has timed out, remediation module 125 may instruct a function responsible for performing the transactions to attempt the transactions using one or more backup or mirrored transaction components.

Transaction components 140A-140C each include a network interface 130, at least one processor 135, a database 145, and memory 150 with at least one program 155. During a transaction, a transaction component may perform one or more operations, such as processing data or fetching data from storage. For example, transaction component 140A may process data using program 155, and transaction component 140B may fetch data from database 145. Server 105 and each transaction component 140A-140C may be connected via a network, including a local area network (LAN), a wide area network (WAN) such as the Internet, or a combination of the two, and includes wired, wireless, or fiber optic connections. In general, the network or networks connecting server 105 and transaction components 140A-140C can be any combination of connections and protocols that will support communications between server 105, and transaction components 140A-140C via their respective network interfaces 130 in accordance with embodiments of the present invention.

Program 155 of memory 150 may include any program for processing data as part of a transaction. For example, program 155 may process data provided by another processing component, or may otherwise generate or process data required to complete a transaction. Database 145 may store data that is used to satisfy requests of a transaction. Database 145 may include any non-volatile storage media known in the art. For example, database 145 can be implemented with a tape library, optical library, one or more independent hard disk drives, or multiple hard disk drives in a redundant array of independent disks (RAID). Similarly, data on database 145 may conform to any suitable storage architecture known in the art, such as a file, a relational database, an object-oriented database, and/or one or more tables.

Figure 2:
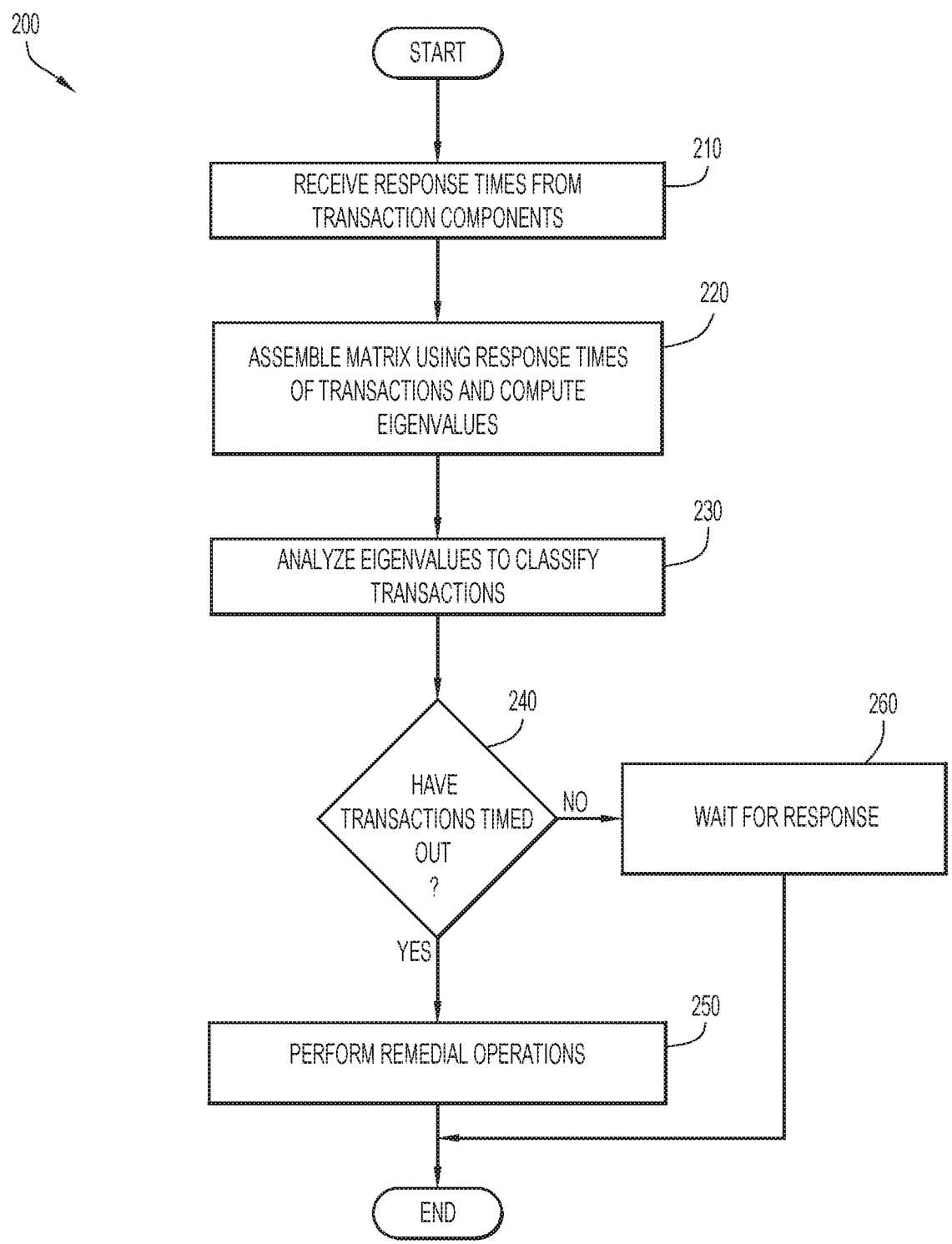
FIG. 2 is a flow chart depicting a method of utilizing a multi-stage watchdog timer in accordance with an embodiment of the present invention.

FIG. 2 is a flow chart depicting a method 200 of utilizing a multi-stage watchdog timer in accordance with an embodiment of the present invention.

Response times are received from transaction components at operation 210. Transaction matrix module 115 of server 105 may receive a set of response times for a transaction, with each response time indicating the amount of time that a transaction component requires to perform the operations for which the transaction component is responsible. Transaction matrix module 115 may receive response times for multiple transactions. In particular, transaction matrix module 115 may receive response times for consecutive transactions, or for transactions that have occurred within a selected time period. Transaction matrix module 115 may store received response times in a data lake for future processing.

A matrix is assembled using response times from multiple transactions, and eigenvalues for the matrix are computed at operation 220. Transaction matrix module 115 may assemble a square matrix by including a number of transactions that is equal to the number of response times in a transaction. For example, if there are three transaction components (e.g., as depicted in FIG. 1), then each transaction will have three response times; thus, transaction matrix module 115 will group three transactions together for each matrix to construct a 3×3 matrix. Once response times are grouped together into a square matrix, eigenvalues for the matrix are calculated. Present invention embodiments reduce the amount of processing power required for a watchdog timer to monitor multi-stage transactions by reducing groups of response times collected from multiple transactions to singular metrics (e.g., eigenvalues) that can be used to evaluate the group of transactions.

The eigenvalues are analyzed to classify transactions at operation 230. Classifier module 120 may utilize conventional or other machine learning techniques in order to classify the eigenvalues into one of two categories to indicate whether or not the corresponding group of transactions has timed out. In some embodiments, the eigenvalues are classified using a naive Bayes classifier.

Operation 240 determines whether the group of transactions has timed out. If the eigenvalues of the analyzed transactions has been classified as timed out, remedial operations are performed at operation 250. If classifier module 120 classifies the eigenvalues into the class of transactions that are not timed out, the system may continue waiting for one or more responses at operation 260.

One or more remedial operations are performed at operation 250. Remediation module 125 may perform one or more remedial operations, such as interrupting the function responsible for the transactions. In some embodiments, transactions may be attempted later after a predefined duration of time. Additionally or alternatively, remedial operations may include attempting transactions using transaction components that have been designated as back-ups.

FIG. 3 is a chart 300 depicting example transaction times in accordance with an embodiment of the present invention. Chart 300 includes transactions 310 and response times 315A-315C. In this example, the response times for three separate three-stage transactions are measured. For example, the first transaction has a response time of 2 ms for the first transaction component, 3 ms for the second transaction component, and 2 ms for the third transaction component. The response times 315A-315C may be assembled by transaction matrix module 115 into a 3×3 square matrix M, as shown in equation (1).

$$M = \begin{bmatrix} 2 & 3 & 2 \\ 4 & 2 & 2 \\ 1 & 2 & 3 \end{bmatrix} \quad (1)$$

Transaction matrix module 115 may then determine the eigenvalues for matrix M. An eigenvalue is a scalar that is associated with a given linear transformation of a vector space, and has the property that there is some nonzero vector which, when multiplied by the eigenvalue, is equal to the vector obtained by letting the transformation operate on the vector. Eigenvalues of a linear mapping provide an approximate measure of the distortion induced by the transformation. Since matrix M is a 3×3 matrix, there will be three eigenvalues, which have values of 7, −1.414, and 1.414. One or more of these eigenvalues may be classified using classifier module 120 to determine whether this group of three transactions has timed out (e.g., based on the magnitude of the eigenvalues). In some embodiments, classifier module 120 determines that a particular eigenvalue magnitude corresponds to a timed-out transaction according to a service level agreement. Alternatively or additionally, transactions may be classified as timed-out when the corresponding eigenvalues deviate a predetermined amount from a baseline. For example, if eigenvalues are two or more standard deviations from a baseline, the corresponding transaction times may be classified as anomalous.

Present invention embodiments thus provide a flexible watchdog timer mechanism that classifies eigenvalues derived from response times instead of setting discrete time limits for each stage of a multi-stage transaction. For example, in the second transaction of table 300, the first response time is 4 ms; if a conventional watchdog timer limited that stage of the transaction to 3 ms, then the operation would time out, despite the other two response times, 2 ms, and 2 ms, potentially being rapid enough to compensate for the first response's delay.

Figure 4:
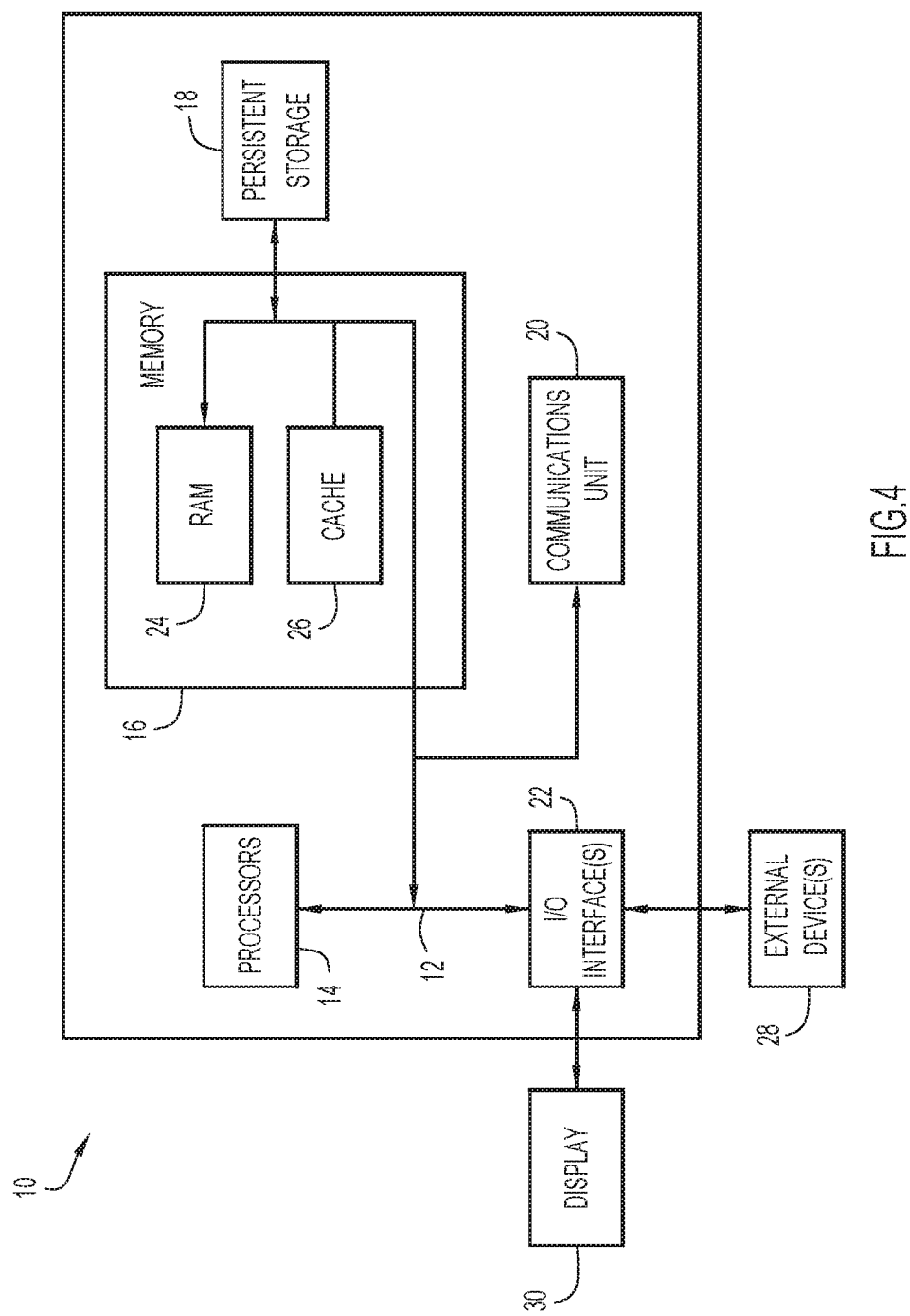
FIG. 4 is a block diagram depicting a computing device in accordance with an embodiment of the present invention.

FIG. 4 is a block diagram depicting components of a computer 10 suitable for executing the methods disclosed herein. Computer 10 may implement server 105 and transaction components 140A-140C in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to a watchdog timer for a multi-stage computing environment (e.g., response time data, transaction data, etc.) may be stored within any conventional or other data structures (e.g., files, arrays, lists, stacks, queues, records, etc.) and may be stored in any desired storage unit (e.g., database, data or other repositories, queue, etc.) The data transmitted between server 105 and transaction components 140A-140C may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to a watchdog timer for a multi-stage computing environment (e.g., response time data, transaction data, etc.) may include any information provided to, or generated by, server 105 and/or transaction components 140A-140C. Data relating to a watchdog timer for a multi-stage computing environment may include any desired format and arrangement, and may include any quantity of any types of fields of any size to store any desired data. The data relating to the watchdog timer may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., response time data, transaction data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of providing a watchdog timer for a multi-stage computing environment.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., server software, communications software, transaction matrix module 115, classifier module 120, remediation module 125, etc.). These systems may include any types of monitors and input devices (e.g., keyboard, mouse, voice recognition, etc.) to enter and/or view information.

It is to be understood that the software (e.g., server software, communications software, transaction matrix module 115, classifier module 120, remediation module 125, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., server software, communications software, transaction matrix module 115, classifier module 120, remediation module 125, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to a watchdog timer for a multi-stage computing environment). The database system may be implemented by any number of any conventional or other databases, data stores or storage structures (e.g., files, databases, data structures, data or other repositories, etc.) to store information (e.g., data relating to a watchdog timer for a multi-stage computing environment). The database system may be included within or coupled to the server and/or client systems. The database systems and/or storage structures may be remote from or local to the computer or other processing systems, and may store any desired data (e.g., data relating to a watchdog timer for a multi-stage computing environment).

The present invention embodiments may employ any number of any type of user interface (e.g., Graphical User Interface (GUI), command-line, prompt, etc.) for obtaining or providing information (e.g., data relating to a watchdog timer for a multi-stage computing environment), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of managing multi-stage transactions, comprising:
   receiving a plurality of response time values of transaction components for a plurality of transactions;
   selecting two or more transactions from the plurality of transactions, wherein a quantity of the selected transactions is equal to a number of the transaction components in the plurality of transactions;
   calculating eigenvalues from the response time values for the selected transactions, wherein each row of a square matrix for calculating the eigenvalues comprises response time values from a same transaction; and
   determining that the selected transactions have timed out by processing the eigenvalues using a machine learning classifier.

2. The computer-implemented method of claim 1, wherein the selected transactions are consecutive transactions.

3. The computer-implemented method of claim 1, wherein the machine learning classifier is a naive Bayes classifier.

4. The computer-implemented method of claim 1, further comprising:
   interrupting the selected transactions in response to determining that the selected transactions have timed out.

5. The computer-implemented method of claim 1, wherein the plurality of transactions transact in a serverless computing environment.

6. A computer system for managing multi-stage transactions, the computer system comprising:
   one or more computer processors;
   one or more computer readable storage media;
   program instructions stored on the one or more computer readable storage media for execution by at least one of the one or more computer processors, the program instructions comprising instructions to:

receive a plurality of response time values of transaction components for a plurality of transactions;

select two or more transactions from the plurality of transactions, wherein a quantity of the selected transactions is equal to a number of the transaction components in the plurality of transactions;

calculate eigenvalues from the response time values for the selected transactions, wherein each row of a square matrix for calculating the eigenvalues comprises response time values from a same transaction; and determine that the selected transactions have timed out by processing the eigenvalues using a machine learning classifier.

7. The computer system of claim 6, wherein the selected transactions are consecutive transactions.

8. The computer system of claim 6, wherein the machine learning classifier is a naive Bayes classifier.

9. The computer system of claim 6, further comprising instructions to:

interrupt the selected transactions in response to determining that the selected transactions have timed out.

10. The computer system of claim 6, wherein the plurality of transactions transact in a serverless computing environment.

11. A computer program product for managing multi-stage transactions, the computer program product comprising one or more computer readable storage media collectively having program instructions embodied therewith, the program instructions executable by a computer to cause the computer to:

receive a plurality of response time values of transaction components for a plurality of transactions;

select two or more transactions from the plurality of transactions, wherein a quantity of the selected transactions is equal to a number of the transaction components in the plurality of transactions;

calculate eigenvalues from the response time values for the selected transactions, wherein each row of a square matrix for calculating the eigenvalues comprises response time values from a same transaction; and determine that the selected transactions have timed out by processing the eigenvalues using a machine learning classifier.

12. The computer program product of claim 11, wherein the selected transactions are consecutive transactions.

13. The computer program product of claim 11, wherein the machine learning classifier is a naive Bayes classifier.

14. The computer program product of claim 11, further comprising instructions to:

interrupt the selected transactions in response to determining that the selected transactions have timed out.

15. The computer program product of claim 11, wherein the plurality of transactions transact in a serverless computing environment.

\* \* \* \* \*